(12) United States Patent
Spears

(10) Patent No.: US 11,415,233 B2
(45) Date of Patent: Aug. 16, 2022

(54) DUAL DISK CHECK VALVE

(71) Applicant: Patrick Spears, Brentwood, CA (US)

(72) Inventor: Patrick Spears, Brentwood, CA (US)

(73) Assignee: CleanNesta LLC

(*) Notice: Subject to any disclaimer, the term of this patent is extended or adjusted under 35 U.S.C. 154(b) by 0 days.

(21) Appl. No.: 17/131,748

(22) Filed: Dec. 23, 2020

(65) Prior Publication Data

US 2022/0196167 A1  Jun. 23, 2022

(51) Int. Cl.
| | | |
|---|---|---|
| *G05D 11/00* | (2006.01) | |
| *F16K 11/10* | (2006.01) | |
| *F16K 47/08* | (2006.01) | |
| *F16K 15/02* | (2006.01) | |

(52) U.S. Cl.
CPC .......... *F16K 11/105* (2013.01); *F16K 15/028* (2013.01); *F16K 47/08* (2013.01); *Y10T 137/2564* (2015.04); *Y10T 137/87684* (2015.04)

(58) Field of Classification Search
CPC ............. F16K 11/105; Y10T 137/7842; Y10T 137/2564; Y10T 137/2567; Y10T 137/87684
See application file for complete search history.

(56) References Cited

U.S. PATENT DOCUMENTS

| | | | | |
|---|---|---|---|---|
| 730,085 A | * | 6/1903 | Berg .................... | F16K 11/044 137/112 |
| 916,268 A | * | 3/1909 | Cameron .............. | F16K 11/044 137/112 |
| 1,196,925 A | * | 9/1916 | Boyer .................... | F16K 11/16 137/605 |
| 2,699,796 A | * | 1/1955 | Grindle ................. | C21B 7/163 137/112 |
| 2,809,659 A | * | 10/1957 | Gillespie .............. | F16K 17/196 137/512 |

(Continued)

FOREIGN PATENT DOCUMENTS

| | | |
|---|---|---|
| CA | 2819735 C | 12/2015 |
| FR | 2523256 A1 | 9/1983 |

(Continued)

OTHER PUBLICATIONS

"Dual Plate Check Valves", https://www.chuankok.com/uploads/4/2/8/4/42846051/f5_1_dual_plate_check_valves.pdf.

(Continued)

*Primary Examiner* — Robert K Arundale

(57) ABSTRACT

A dual-disk check valve is disclosed. The dual-disk check valve comprises a housing having at least two inlet ports and an outlet port, at least two adapters securely affixed to both inlet ports, and a valve assembly, which is respectively disposed at each inlet port. The valve assembly at the inlet ports is configured to operate within the housing according to the fluid flow. The valve assembly comprises a disc provided with a spring, which is securely disposed against the respective two inlet ports using seat rings and washers. The disc at one inlet port is adapted for movement between an open position and a closed position, thereby preventing the fluid flow via the inlet port to the outlet port when another inlet port is opened for allowing fluid flow through it. The one inlet port is configured to automatically close when the fluid flows from another inlet port.

10 Claims, 10 Drawing Sheets

(56) References Cited

U.S. PATENT DOCUMENTS

| | | | | |
|---|---|---|---|---|
| 3,139,932 | A * | 7/1964 | Glennd | E21B 23/12 |
| | | | | 166/368 |
| 3,191,613 | A * | 6/1965 | Bagweil | F16K 15/03 |
| | | | | 137/110 |
| 3,550,612 | A * | 12/1970 | Maxon | F01P 3/205 |
| | | | | 137/112 |
| 5,791,631 | A | 8/1998 | Martin | |
| 6,397,874 | B1 * | 6/2002 | Featheringill | E03F 1/006 |
| | | | | 137/112 |
| 8,220,774 | B2 | 7/2012 | Borst | |
| 8,555,923 | B1 | 10/2013 | Minnick | |
| 9,298,190 | B2 | 3/2016 | Oksanen | |
| 10,731,767 | B2 * | 8/2020 | Jeon | F16K 11/105 |
| 2005/0166971 | A1 | 8/2005 | Arov | |
| 2013/0140476 | A1 | 6/2013 | Burgess | |

FOREIGN PATENT DOCUMENTS

| | | |
|---|---|---|
| KR | 101003768 B1 | 12/2010 |
| KR | 20170064878 A | 6/2017 |
| WO | 2012145606 A2 | 10/2012 |

OTHER PUBLICATIONS

"Spring Loaded Disc-type Check Valves", https://www.tlv.com/global/TI/product-solutions/spring-disc-type-check-valves.html#3.
"CV890 Dual Disc Check Valve", https://www.asc-es.com/products/cv890-dual-disc-valve.

* cited by examiner

DUAL DISK CHECK VALVE

BACKGROUND OF THE INNOVATION

A. Technical Field

The invention disclosed herein generally relates to a dual disk check valve. More particularly, the present invention relates to a dual check valve configured to easily and conveniently install or fix to the residential and commercial water supply lines for different applications.

B. Description of Related Art

Check valves are used to restrict flow of fluids such as liquid and gas to only one direction. In general, check valves are two-port valves. The two-port valve has two opening ports in the valve body, where one port allows the fluid to enter and the other port allows the fluid to leave. Selection of an appropriate check valve depends on the working fluid, its physical and chemical characteristics, the piping system, and the operating temperature and pressure as known in the art.

Typically, the check valve is installed in a piping system with the inlet port connected to the upstream part of the system, and the outlet port to the downstream part. When the upstream pressure exceeds the downstream pressure, as in normal operation, the upstream fluid pressure is sufficient to overcome the biasing spring force and displace the sealing member or flapper from its seated position allowing fluid to enter the valve body. The fluid then exits the valve body through the outlet port unobstructed.

Thus, the check valve permits fluid flow in the direction from upstream or inlet port to downstream or outlet port during ordinary operation, that is, when upstream pressure exceeds downstream pressure. However, when the downstream pressure meets or exceeds the upstream pressure, which can occur, for example, due to an obstruction downstream, the biasing spring force and/or the downstream pressure force the sealing member back into its seated position to prevent back-flow of the fluid.

Few existing patent references attempted to address the aforementioned problems are cited in the background as prior art over the presently disclosed subject matter and are explained as follows:

A prior art U.S. Pat. No. 3,974,848 to Wheatley Thomas, entitled "Three pot two way check valve" discloses a three port, two way check valve. It is made of a standard tee and standard flanges attached thereto. A flat disc is inserted in one of the openings, the disc incorporating an internal circular valve seat and a hinged valve member which closes against the disc. A similar apparatus is installed in the center port of the tee. The flapper valve elements are connected together by a connecting rod. The connecting rod assures the functioning of the check valve. The dual check valve is useful for protecting the pump against reverse flow and a seal adapted to contact the periphery of circular valve elements.

Another prior art FR2523256 to Corbellini Carlo, entitled "Three-port non-return valve—has two inlets each with spring loaded valve in opposition" discloses a three-port non-return valve, which has two inlets attached to the fluid pipes and the valve is in the form of tee shaped design. The three port non-return valve has two inlets, where each inlet is provided with spring loaded disk. The valve seats are placed at each inlet of the flanged branches and the valve disk are maintained on their seats by the spring and sealing is obtained by pressing the disc on one sharp edge forming the end of the tubular portion of the fluid inlet.

Another prior art U.S. Pat. No. 6,748,965 to Lee Hang-Chung, entitled "Double directional check valve and flow restrictor combination" discloses a double directional check valve and flow restrictor combination including a housing which contains a pair of axially-aligned check valves and a flow restrictor disposed between the check valves. Dry purge air flows into the housing through the flow restrictor, which facilitates smooth and uniform flow of the air, and out of one of the check valves to a dessicant chamber to dry or regenerate dessicant in the chamber. The housing is fitted with flanges or other connection structures for quick, easy and convenient attachment of the housing to a piping network in an air, nitrogen or other process drying system.

Though the discussed prior art references are useful to some extent for some purposes, these prior efforts sometimes yield a poor efficiency with increased operating costs and poor experience to users. In some prior arts, there is no protection from backpressure for both inlets. Therefore, there is a need for a dual disk check valve configured to use in spraying machines. Also, there is a need for a dual disk check valve that can provide optimal mechanical and chemical performance.

SUMMARY OF THE INNOVATION

The present invention discloses a dual disk check valve according to an embodiment of the present invention is disclosed. In one embodiment, the dual disk check valve is configured to easily and conveniently install or fix to the residential and commercial water supply lines for different applications. In one embodiment, the dual disk check valve comprises a housing having at least two inlet ports i.e., a first inlet port and second inlet port, and an outlet port. In one embodiment, the housing is capable to handle the pressure about, but not limited to, 70 bar. In one embodiment, the housing further comprises ⅜" screwed female BSP parallel threads at the both inlet ports i.e., the first inlet port, the second inlet port, and the outlet port. In one embodiment, the housing could be a T-shaped structure. In one embodiment, the dual disk check valve further comprises a valve assembly, which is respectively disposed at each inlet port. In one embodiment, the valve assembly at the two inlet ports is configured to operate within the housing according to the fluid flow.

In one embodiment, the valve assembly comprises a disc provided with a spring, seat rings, and washers. In one embodiment, the disc provided with a spring is securely disposed against the respective two inlet ports i.e., a first inlet port and second inlet port using one or more washers. In one embodiment, the disc at the first inlet port is adapted for movement between an open position and a closed position, thereby preventing the fluid flow via the first inlet port to the outlet port when the second inlet port is opened for permitting the fluid flow through it. The disc is configured to securely move and hold to the seat ring at the first inlet port when the fluid flows via the second inlet port to the outlet port. In one embodiment, the seat rings are disposed at each inlet port i.e., a first inlet port and second inlet port for securely holding the discs according to the fluid flow via the first inlet port and the second inlet port.

In one embodiment, the dual disk check valve further comprises at least one adapter, which is securely and respectively affixed to both inlet ports i.e., a first inlet port and second inlet port via a plurality of threads. In one embodiment, the two inlet ports i.e., a first inlet port and second inlet port and the outlet port are positioned at right angle to one and another. In one embodiment, the first inlet port, second inlet port, and the outlet port are a combination of a shuttle valve and a non-return valve.

In one embodiment, the housing comprises a shape include, but not limited to, a T-shape. In one embodiment, the adapters are securely threaded to the housing at both inlet ports i.e., a first inlet port and second inlet port via a plurality of threads.

In one embodiment, the first inlet port is configured to always keep in an open position and the second inlet port is in the closed position. In one embodiment, the first inlet port is configured to be in the open position, thereby enabling the check valve to operate at negative pressure. When the second inlet port is opened then the first inlet port will be closed automatically due to the fluid flow. The first inlet port is further configured to automatically close when the fluid flows from the second inlet port. The fluid stream line from the second inlet port pushes the disc to the seat ring at the first inlet port, thereby closing the first inlet port and preventing the fluid flow from the first inlet port to the outlet port. Hence, the fluid stream line could flow through the second inlet port to the outlet port. It is also protecting the pump at both ends from backpressure from the outlet line. In an exemplary embodiment, the spring is designed for 14.7 psi pressure and providing low tension.

In one embodiment, the dual disk check valve is made of at least any one of a material includes, but not limited to, thermoset materials, thermoplastics materials, and metals, etc. In an exemplary embodiment, the dual disk check valve could be made of a thermoplastic material for lower temperature and pressure. In one embodiment, the dual disk check valve could also be designed in different end connections as well for example flanged end, qdc end, etc.

Other objects, features and advantages of the present innovation will become apparent from the following detailed description. It should be understood, however, that the detailed description and the specific examples, while indicating specific embodiments of the innovation, are given by way of illustration only, since various changes and modifications within the spirit and scope of the innovation will become apparent to those skilled in the art from this detailed description.

BRIEF DESCRIPTION OF DRAWINGS

The foregoing summary, as well as the following detailed description of the innovation, is better understood when read in conjunction with the appended drawings. For the purpose of illustrating the innovation, exemplary constructions of the innovation are shown in the drawings. However, the innovation is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION OF EMBODIMENTS

A description of embodiments of the present innovation will now be given with reference to the Figures. It is expected that the present innovation may be embodied in other specific forms without departing from its spirit or essential characteristics. The described embodiments are to be considered in all respects only as illustrative and not restrictive.

Figure 1:
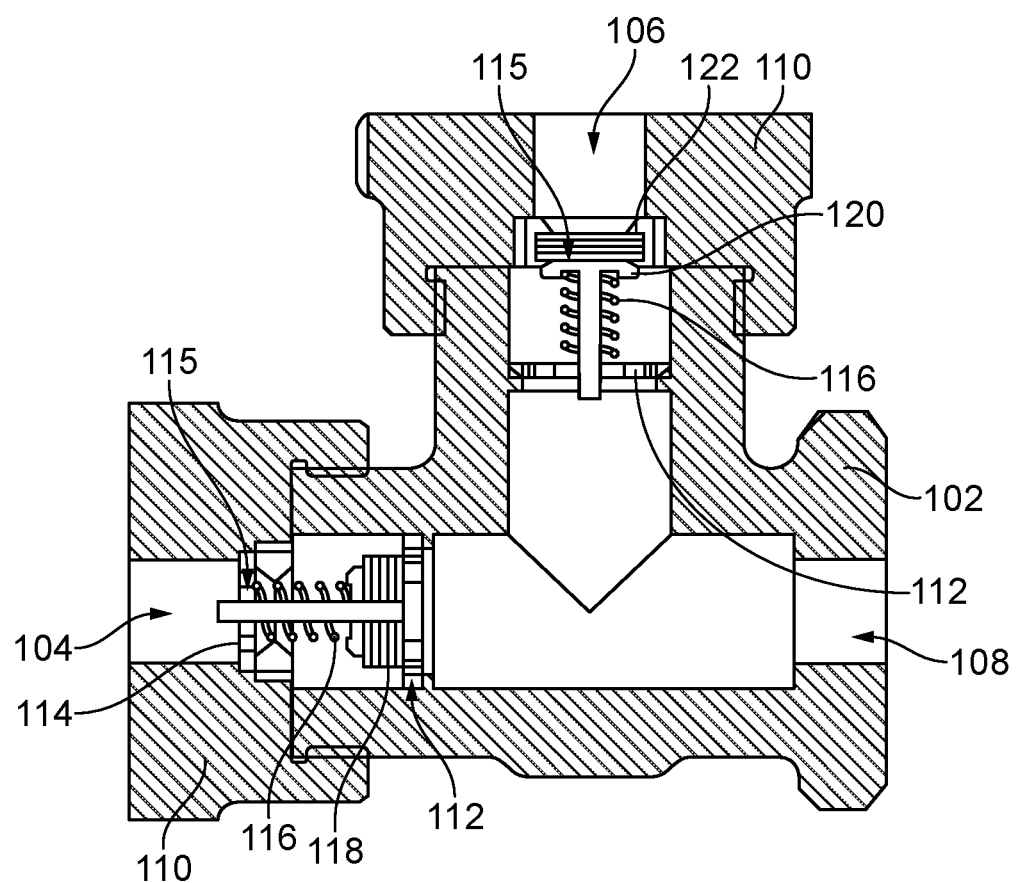
FIG. 1 exemplarily illustrates a sectional view of a dual disk check valve, according to an embodiment of the present invention.
Figure 2:
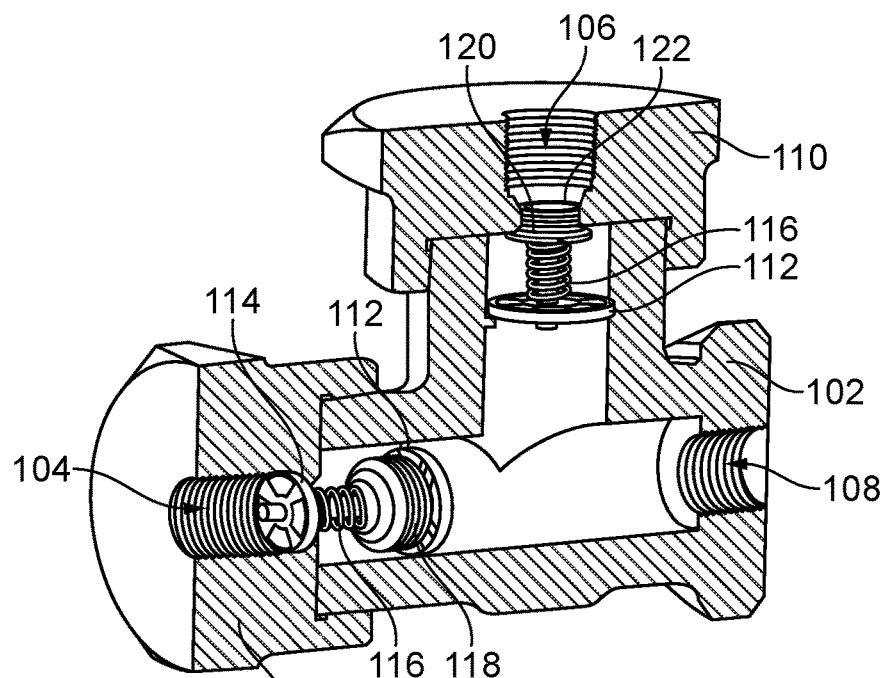
FIG. 2 exemplarily illustrates a sectional of the dual disk check valve having at least two inlet ports and an outlet port, according to an embodiment of the present invention.
Figure 3:
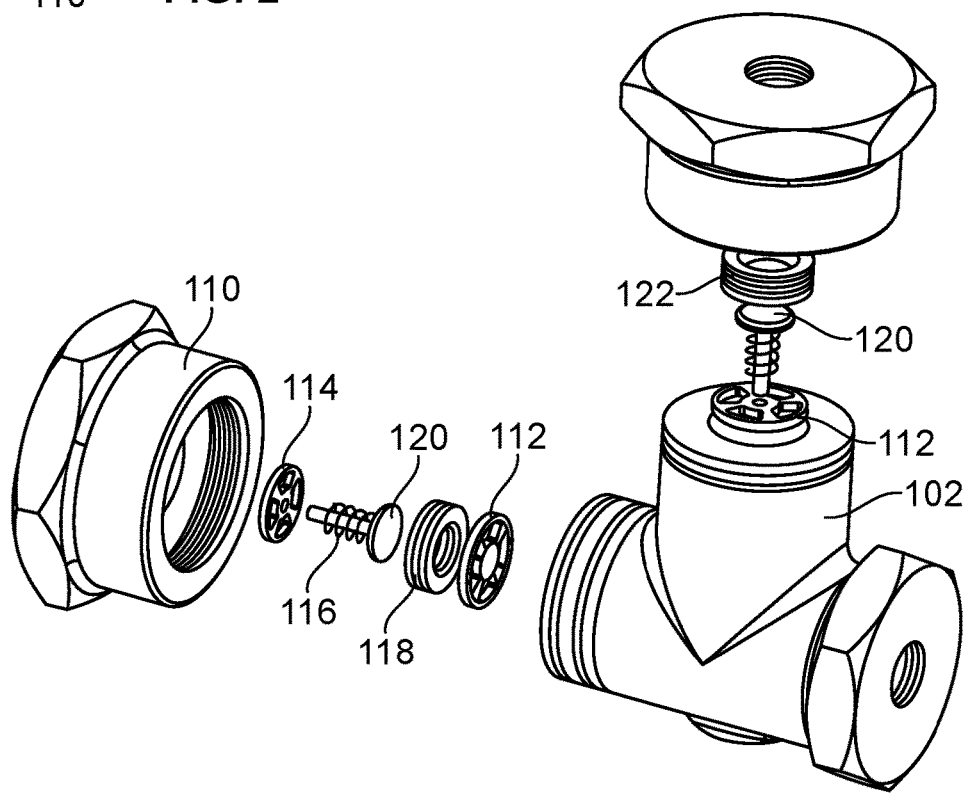
FIG. 3 exemplarily illustrates an exploded view of the dual disk check valve, according to one embodiment of the present invention.

Referring to FIGS. 1-3, a dual disk check valve 100 according to an embodiment of the present invention is disclosed. In one embodiment, the dual disk check valve 100 is configured to easily and conveniently install or fix to the residential and commercial water supply lines for different applications. The dual check valve 100 according to one embodiment, configured to use in spraying machines. In one embodiment, the dual disk check valve 100 comprises a housing 102 having at least two inlet ports i.e., a first inlet port 104 and second inlet port 106, and an outlet port 108. In one embodiment, the dual disk check valve 100 further comprises a valve assembly 115, which is respectively disposed at each inlet port. In one embodiment, the valve assembly 115 at the two inlet ports is configured to operate within the housing 102 according to the fluid flow.

In one embodiment, the valve assembly 115 comprises a disc 120 provided with a spring 116, seat rings (118 and 122), and washers (112 and 114). In one embodiment, the disc 120 provided with a spring 116 is securely disposed against the respective two inlet ports i.e., a first inlet port 104 and second inlet port 106 using one or more washers (112 and 114). In one embodiment, the disc 120 at the first inlet port 104 is adapted for movement between an open position and a closed position, thereby preventing the fluid flow via the first inlet port 104 to the outlet port 108 when the second inlet port 106 is opened for permitting the fluid flow through it. The disc 120 is configured to securely move and hold to the seat ring 118 at the first inlet port 104 when the fluid flows via the second inlet port 106 to the outlet port 108. In one embodiment, the seat rings (118 and 122) are disposed at each inlet port i.e., a first inlet port 104 and second inlet port 106 for securely holding the discs 120 according to the fluid flow via the first inlet port 104 and the second inlet port 106.

In one embodiment, the dual disk check valve 100 further comprises at least one adapter 110, which is securely and respectively affixed to both inlet ports i.e., a first inlet port 104 and second inlet port 106 via a plurality of threads. In one embodiment, the two inlet ports i.e., a first inlet port 104 and second inlet port 106 and the outlet port 108 are positioned at right angle to one and another. In one embodiment, the first inlet port 104, second inlet port 106, and the outlet port 108 are a combination of a shuttle valve and a non-return valve.

In one embodiment, the dual disk check valve 100 is made of at least any one of a material includes, but not limited to, thermoset materials, thermoplastics materials, and metals, etc. In an exemplary embodiment, the dual disk check valve 100 could be made of a thermoplastic material for lower temperature and pressure. In one embodiment, the dual disk check valve 100 could also be designed in different end connections as well for example flanged end, qdc end, etc.

Again, referring to FIG. 3, an exploded view of the dual disk check valve 100 according to an embodiment of the present invention is disclosed. In one embodiment, the housing 102 comprises a shape include, but not limited to, a T-shape. In one embodiment, the adapters 110 are securely threaded to the housing 102 at both inlet ports i.e., a first inlet port 104 (shown in FIG. 1) and second inlet port 106 (shown in FIG. 1) via a plurality of threads.

In one embodiment, the first inlet port 104 is configured to always keep in an open position. In one embodiment, the first inlet port is configured to be in the open position, thereby enabling the check valve to operate at negative pressure. The first inlet port 104 is further configured to automatically close when the fluid flows from the second inlet port 106. The fluid stream line from the second inlet port 106 pushes the disc 120 to the seat ring 118 at the first inlet port 104, thereby closing the first inlet port 104 and preventing the fluid flow from the first inlet port 104 to the outlet port 108. Hence, the fluid stream line could flow through the second inlet port 106 to the outlet port 108. It is also protecting the pump at both ends from backpressure from the outlet line. In an exemplary embodiment, the spring 116 is designed for 14.7 psi pressure and providing low tension.

In one embodiment, the housing 102 is capable to handle the pressure about, but not limited to, 70 bar. In one embodiment, the housing 102 further comprises ⅜" screwed female BSP parallel threads at the both inlet ports i.e., the first inlet port 104, the second inlet port 106, and the outlet port 108. In an exemplary embodiment, the thickness of the shell is about, but not limited to, 10 mm and the weight is about, but not limited to, 0.5 kg.

Figure 4:
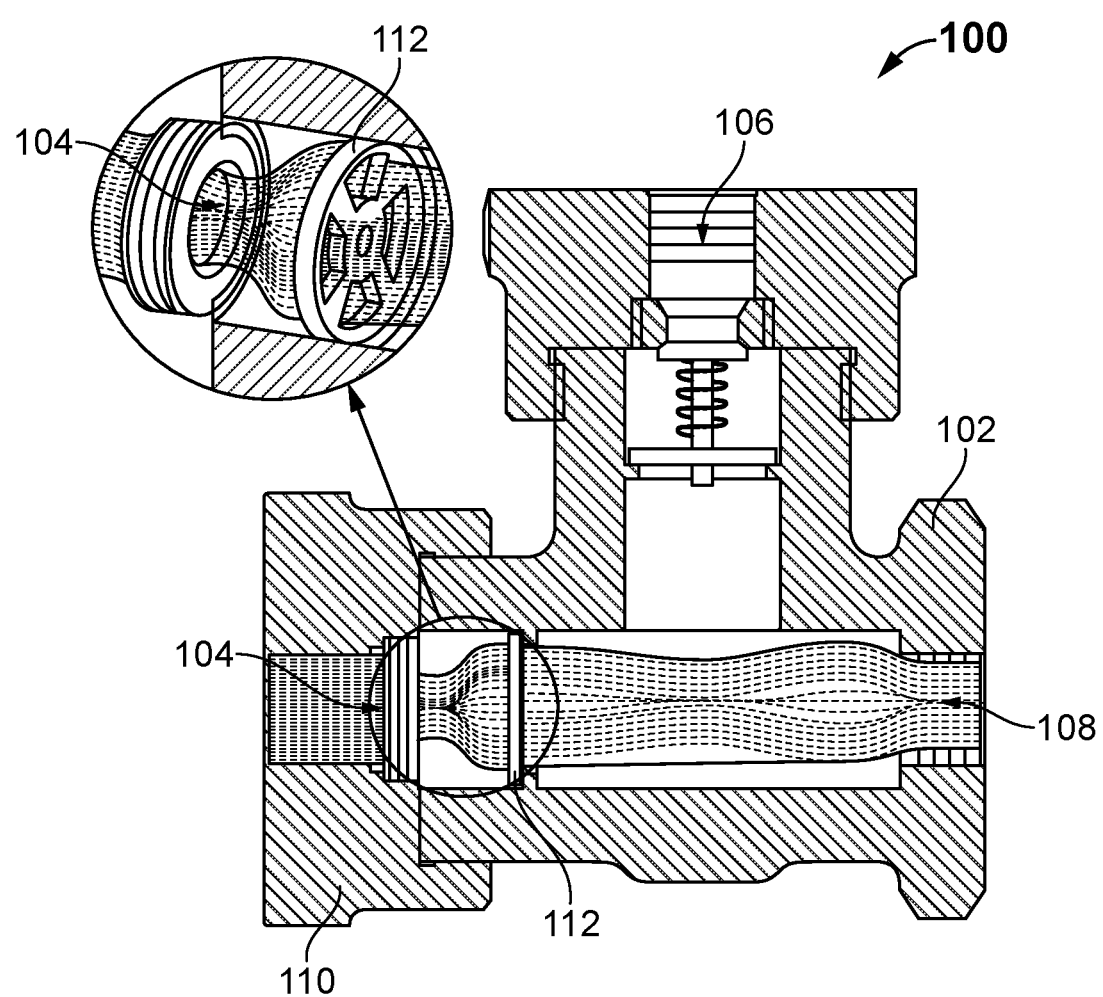
FIG. 4 exemplarily illustrates a sectional view of a first inlet port of the dual disk check valve in an open position, according to one embodiment of the present invention.

Referring to FIG. 4, the first inlet port 104 of the dual disk check valve 100 in an open position according to one embodiment is disclosed. In one embodiment, the first inlet port 104 is always kept in the open position for allowing the fluid flow from the first inlet port 104 to the outlet port 108 and the second inlet port 106 is in the closed position. In one embodiment, the first inlet port is in the open position to enable the check valve to operate at negative pressure. In one embodiment, the first inlet port 104 is further configured to automatically close when the fluid flows from the second inlet port 106.

Figure 5:
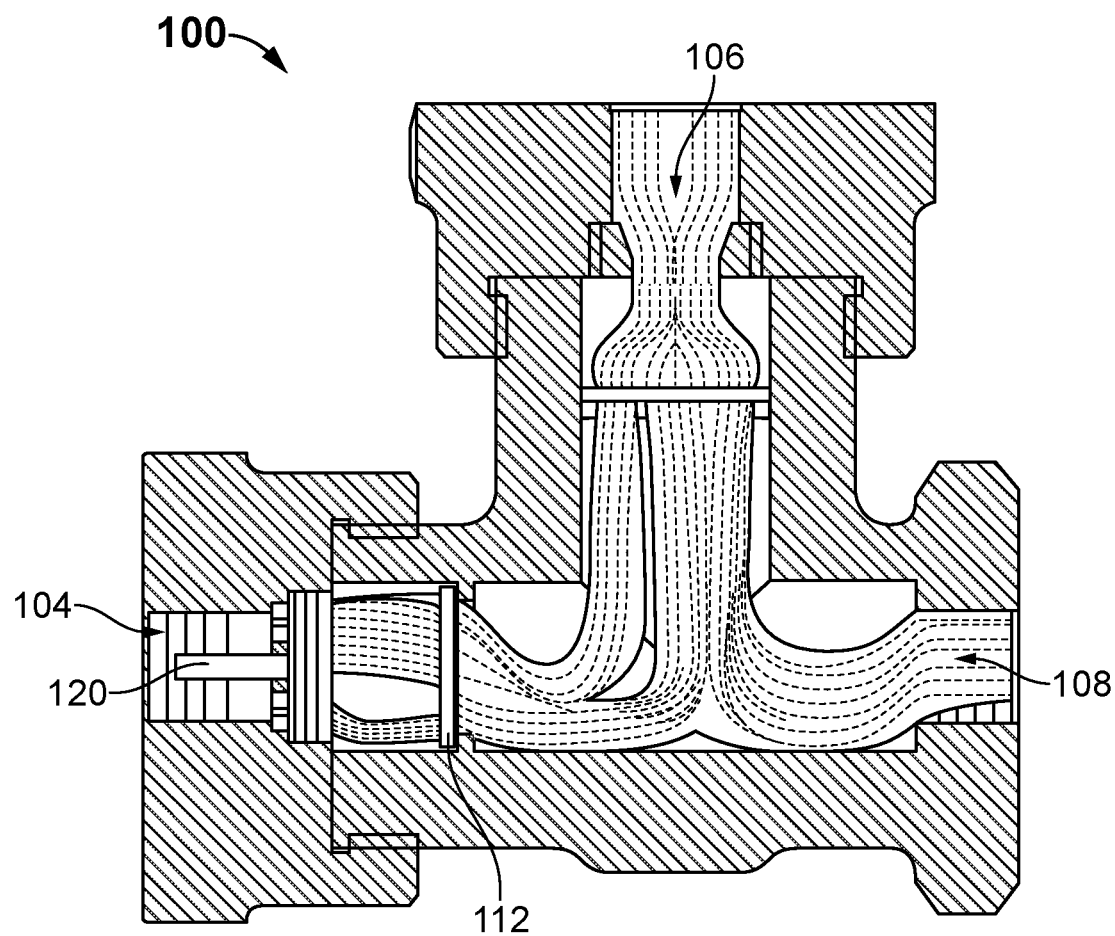
FIG. 5 exemplarily illustrates a sectional view of a second inlet port of the dual disk check valve in an open position, according to one embodiment of the present invention.
Figure 6:
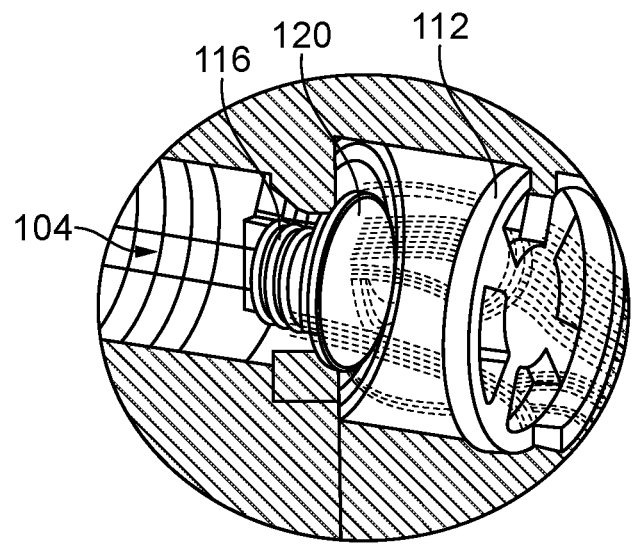
FIG. 6 exemplarily illustrates an enlarged view of the first inlet port of the dual disk check valve in a closed position, according to one embodiment of the present invention.
Figure 7:
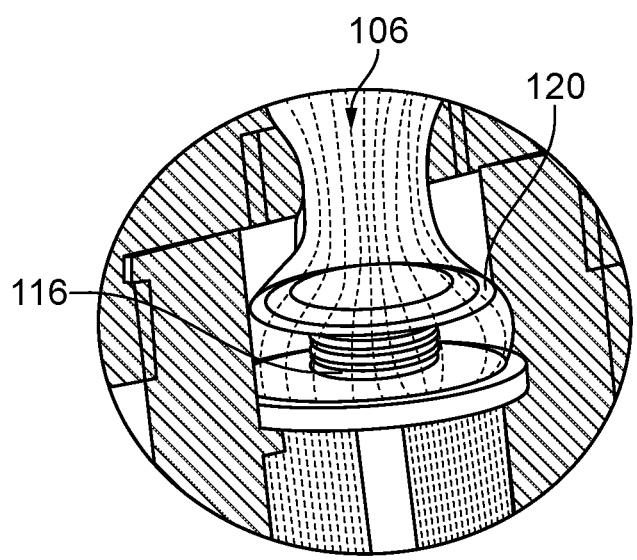
FIG. 7 exemplarily illustrates an enlarged view of the second inlet port of the dual disk check valve in an open position, according to one embodiment of the present invention.

Referring to FIGS. 5-7, the second inlet port 106 of the dual disk check valve 100 in an open position according to one embodiment is disclosed. In one embodiment, the second inlet port 106 could be opened for allowing the fluid flow from the second inlet port 106 to the outlet port 108. When the second inlet port 106 is opened then the first inlet port 104 will be closed automatically due to the fluid flow. In one embodiment, the disc 120 at the first inlet port 104 is configured to adapt for movement between an open position and a closed position, thereby preventing the fluid flow via the first inlet port 104 to the outlet port 108 when the second inlet port 106 is opened for permitting the fluid flow through it. The fluid stream line from the second inlet port 106 pushes the disc 120 to the seat ring 118 at the first inlet port 104, thereby closing the first inlet port 104 and preventing the fluid flow from the first inlet port 104 to the outlet port 108. In one embodiment, the spring 116 could provide low tension according to the fluid flow from the first inlet port 104 and the second inlet port 106.

Figure 8:
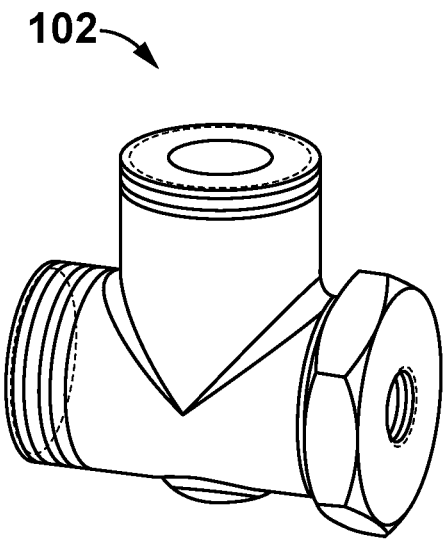
FIG. 8 exemplarily illustrates a perspective view of the housing of the dual disk check valve, according to one embodiment of the present invention.
Figure 9:
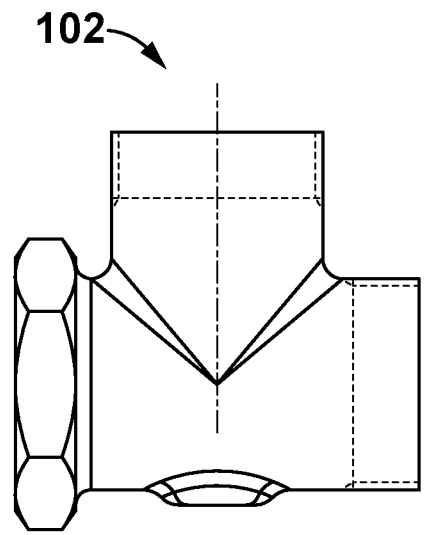
FIG. 9 exemplarily illustrates a side view of the housing of the dual disk check valve, according to one embodiment of the present invention.
Figure 10:
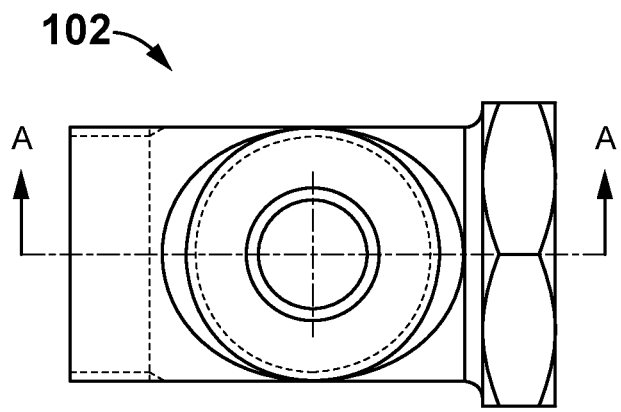
FIG. 10 exemplarily illustrates a top view of the housing of the dual disk check valve, according to one embodiment of the present invention.

Referring to FIGS. 8-10, the housing 102 of the dual disk check valve 100 according to one embodiment is disclosed. In one embodiment, the housing 102 could be a T-shaped structure. In one embodiment, the housing 102 could be designed with different dimensions according to the application of the dual disk check valve 100. In one embodiment, the housing 102 is configured to easily and conveniently install or fix to the residential and commercial water supply lines for different applications. The dual check valve 100 according to one embodiment, configured to use in spraying machines.

Figure 11:
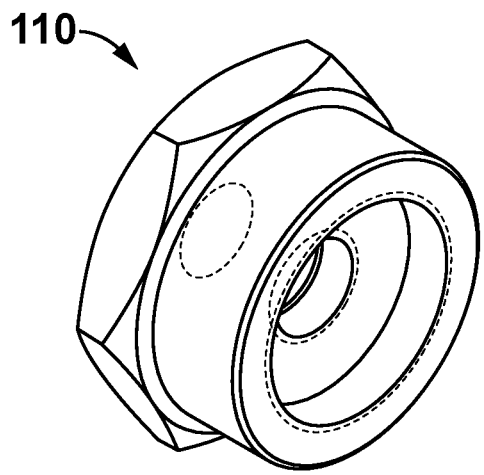
FIG. 11 exemplarily illustrates a perspective view of the adapter of the dual disk check valve, according to one embodiment of the present invention.
Figure 12:
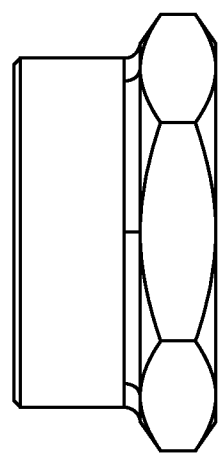
FIG. 12 exemplarily illustrates a side view of the adapter of the dual disk check valve, according to one embodiment of the present invention.
Figure 13:
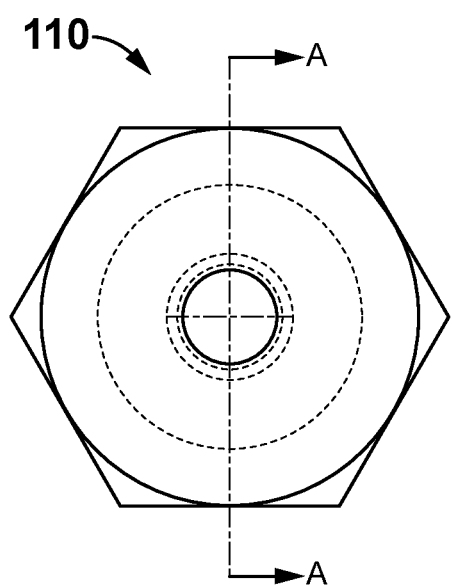
FIG. 13 exemplarily illustrates a top view of the adapter of the dual disk check valve, according to one embodiment of the present invention.

Referring to FIGS. 11-13, the adapter 110 of the dual disk check valve 100 according to one embodiment is disclosed. In one embodiment, the adapter 110 is securely and threadably affixed to the housing 102 via a plurality of threads. In one exemplary embodiment, the adapter 110 is securely affixed to the inlet ports (104 and 106) via a plurality of threads. In an exemplary embodiment, the adapter 110 comprises a hexagonal head having a diameter of about, but not limited to, 69.28 mm and an inner diameter is about, but not limited to, 43.40 mm. In one embodiment, the check valve 100 has a diameter of about 10 mm or ⅜". In one embodiment, the check valve 100 further comprises a diameter of about, but not limited to, 15 mm or ½", 20 mm or ¾", 25 mm or 1", 32 mm or 1¼", 40 mm, 50 mm, 65 mm, 80 mm, and 100 mm.

Figure 14:
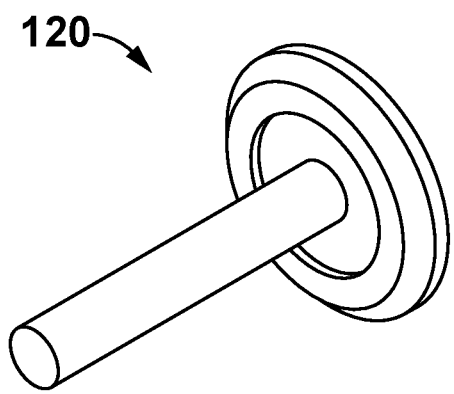
FIG. 14 exemplarily illustrates a perspective view of the disc of the dual disk check valve, according to one embodiment of the present invention.
Figure 15:
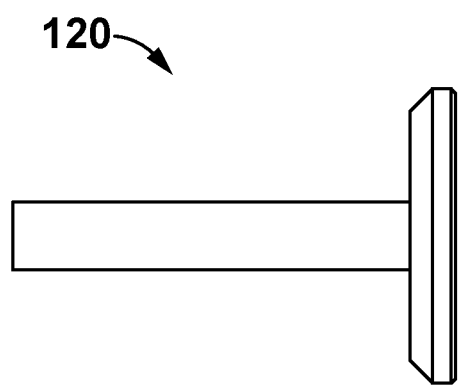
FIG. 15 exemplarily illustrates a side view of the disc of the dual disk check valve, according to one embodiment of the present invention.

Referring to FIGS. 14-15, a disc 120 of the dual disk check valve 100 according to one embodiment is disclosed. In one embodiment, the disc 120 at the first inlet port 104 is configured to adapt for movement between an open position and a closed position, thereby preventing the fluid flow via the first inlet port 104 to the outlet port 108 when the second inlet port 106 is opened for permitting the fluid flow through it. In one embodiment, the disc 120 is further configured to securely move and hold to the seat rings (118 and 122) at both inlet ports i.e., the first inlet port 104 and second inlet port 106 according to the fluid flow from both inlet ports. In an exemplary embodiment, the diameter of the disc 120 is about, but not limited to, 13 mm and the length of the shaft of the disc is about, but not limited to, 17.50 mm.

Figure 16:
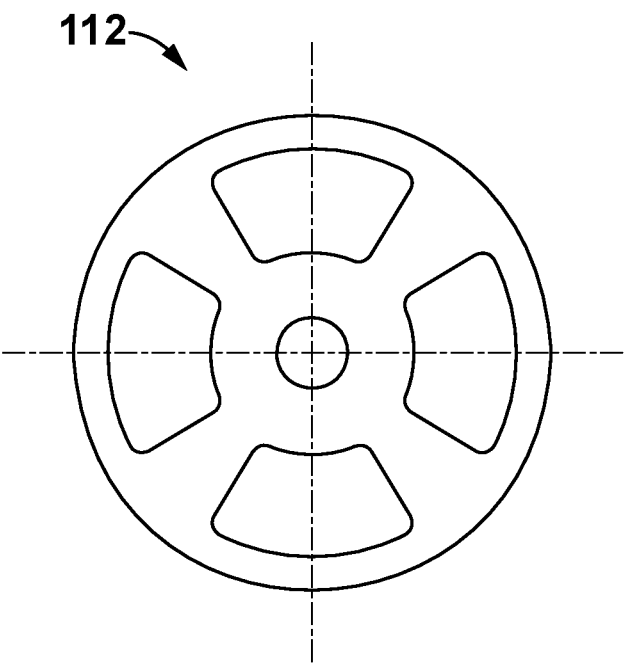
FIGS. 16-17 exemplarily illustrate top views of the washers of the dual disk check valve, according to one embodiment of the present invention.
Figure 17:
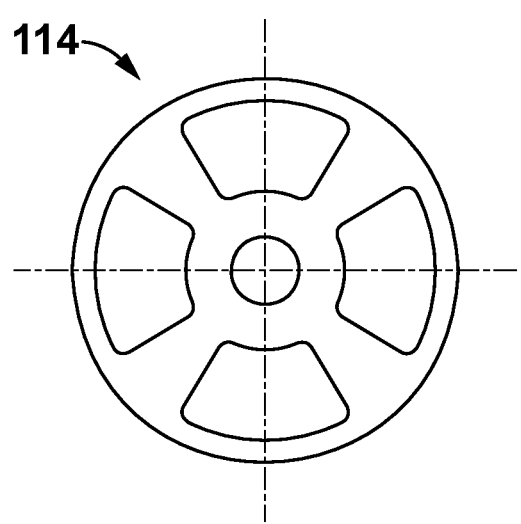

Referring to FIGS. 16-17, the washers (112 and 114) of the dual disk check valve 100 according to one embodiment is disclosed. In one embodiment, the disc 120 is securely disposed against the first inlet port 104 using the washers (112 and 114). In one embodiment, the disc 120 is securely disposed against the second inlet port 106 using the washer 112. In an exemplary embodiment, the diameter of the washer 112 is about, but not limited to, 21 mm. In an exemplary embodiment, the diameter of the washer 114 is about, but not limited to, 17 mm. In an exemplary embodiment, the inner circle radius of the washer 112 is about, but not limited to, 4.5 mm. In an exemplary embodiment, the inner circle radius of the washer 114 is about, but not limited to, 3.50 mm.

Figure 18:
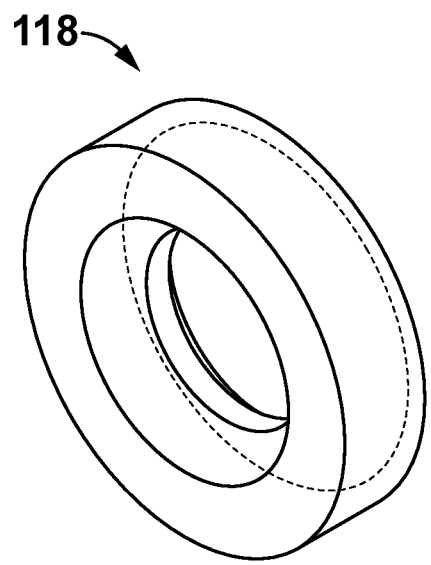
FIGS. 18-19 exemplarily illustrate perspective views of the seat rings of the dual disk check valve, according to one embodiment of the present invention.
Figure 19:
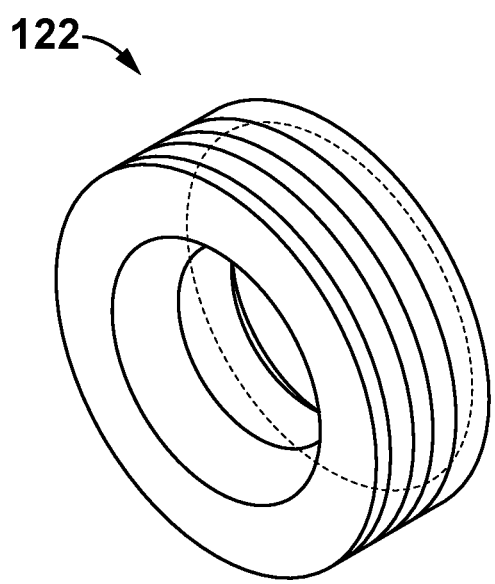

Referring to FIGS. 18-19, the perspective views of the seat rings (118 and 122) respectively, according to one embodiment of the present invention. In one embodiment, the seat rings (118 and 122) are securely disposed at both inlet ports i.e., a first inlet port 104 and second inlet port 106. In one embodiment, the seat rings (118 and 122) are configured to securely hold the disc 120 at both inlet ports i.e., a first inlet port 104 and second inlet port 106 according to the fluid flow.

In one embodiment, the diameter of the seat ring 118 is about, but not limited to, M20×2.0 mm and the thickness is about, but not limited to, 5 mm. In one embodiment, the seating area of the seat ring 118 is about, but not limited to, 1.00×45 mm and the diameter of the seating area is about, but not limited to, 10 mm.

In one embodiment, the diameter of the seat ring 122 is about, but not limited to, M20×2.0 mm and the thickness is about, but not limited to, 7 mm. In one embodiment, the seating area of the seat ring 122 is about, but not limited to, 1.00×45 mm and the diameter of the seating area is about, but not limited to, 10 mm.

Figure 20:
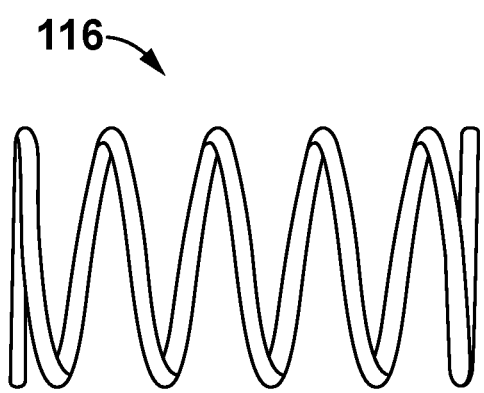
FIG. 20 exemplarily illustrate a perspective view of the spring of the dual disk check valve, according to one embodiment of the present invention.

Referring to FIG. 20, a perspective view of a spring 116, according to one embodiment of the present invention. The spring 116 is securely disposed against the respective inlet ports. In one embodiment, the spring 116 is securely disposed against the first inlet port and the second inlet port using one or more washers (112 and 114). In one embodiment, the spring 116 is a round wire compression spring fabricated using, but not limited to, EN 10270 Pt3 Aust stainless steel. The spring 116 has young's modulus of about, but not limited to, 185000 MPa and rigidity modulus of about 73000 MPa. The spring 116 has the density of about, but not limited to, 0.00000790 kg/mm$^3$. In one embodiment, the spring 116 could have the unprestressed range including, but not limited to, 0-45%. In one embodiment, the spring 116 could have the prestressed range including, but not limited to, 45-56%. The ends of the spring 116 are closed and round edges. In one embodiment, the spring 116 will change with respect to the required opening or closing pressure. It is not always 14.5 psi or 1 bar pressure. Even the material of spring 116 could be changed later moreover properties of material, for example, "EN 10270 Pt3 Aust stainless steel", which is fixed at certain temperature.

In an exemplary embodiment, the spring 116 has a dimension of about 0.61 mm wire diameter. The spring 116 has an inner diameter (ID) of about 6.28 mm and an outside diameter (OD) of about 7.5 mm. Further, the outer diameter expansion as solid is about 0.114 mm. The spring 116 has about 6 total coils including 4 active coils and 2 dead coils with about 50% tip thickness. It has a spring rate about 0.95 N/mm and free length of about 13.50 mm. It has a solid length of about 3.66 mm and maximum solid length of about 3.71 mm. The spring 116 has solid load of about 9.50 N and solid stress of about 734.51 Mpa. It has 1.12 stress factor and 11.30 spring index. It has a helix angle of about 8.07 degrees. In addition, it has 13.5 mm buckling possible, 13.5 mm buckling definite, and 3.07 mm spring pitch. The spring 116 has a mean coil diameter of about 6.89 mm and wire length of about 130.76 mm. The spring 116 has weight of about 0.000302 kg. Further, it has the natural frequency of about 65938 rpm.

In an exemplary embodiment, the spring 116 has a length of about 6 mm. It has a load of about 7.24 N. it has the deflection of about 7.5 mm. The spring 116 has the stress of about 560 MPa. It has solid stress of about 76%. further, the spring 116 has an OD expansion of about 0.0869 mm. In an exemplary embodiment, the spring 116 has the following spring tolerances. It has the free length of about 13.5 mm, outside diameter of about, but not limited to, 7.5 mm and spring rate is about, but not limited to, 0.966 load per one unit of distance traveled.

Preferred embodiments of this innovation are described herein, including the best mode known to the inventors for carrying out the innovation. It should be understood that the illustrated embodiments are exemplary only and should not be taken as limiting the scope of the innovation.

The foregoing description comprise illustrative embodiments of the present innovation. Having thus described exemplary embodiments of the present innovation, it should be noted by those skilled in the art that the within disclosures are exemplary only, and that various other alternatives, adaptations, and modifications may be made within the scope of the present innovation. Merely listing or numbering the steps of a method in a certain order does not constitute any limitation on the order of the steps of that method. Many modifications and other embodiments of the innovation will come to mind to one skilled in the art to which this innovation pertains having the benefit of the teachings in the foregoing descriptions. Although specific terms may be employed herein, they are used only in generic and descriptive sense and not for purposes of limitation. Accordingly, the present innovation is not limited to the specific embodiments illustrated herein.

What is claimed is:

1. A dual disk check valve, comprising,
    a housing having two inlet ports and an outlet port;
    two adapters securely affixed to both inlet ports respectively via a thread, a valve assembly disposed at each inlet port respectively, wherein the valve assembly at each inlet ports is configured to operate within the housing according to the fluid flow, wherein the valve assembly at each inlet ports comprising:
        a disc provided with a spring, a seat ring and a washer;
        wherein the disc at one inlet port is adapted for movement between an open position and a closed position, and
        the seat ring disposed at each inlet port for securely holding the disc via the inlet ports.

2. The dual disk check valve of claim 1, wherein the housing is a T-shaped structure.

3. The dual disk check valve of claim 1, wherein the two inlet ports are a first fluid flow inlet port and a second fluid flow inlet port.

4. The dual disk check valve of claim 1, wherein one of two inlet ports is further configured to automatically close when the fluid flows from another one of two inlet ports.

5. The dual disk check valve of claim 1, wherein the two inlet ports and outlet port are a combination of a shuttle valve and a non-return valve.

6. The dual disk check valve of claim 1, is made of at least one of a material includes thermoset materials, thermoplastics materials, and metals.

7. A dual disk check valve, comprising,
a T-shaped housing having a first inlet port, a second inlet port, and an outlet port;
two adapters securely affixed to the T-shaped housing at both first inlet port and second inlet port via a thread;
a valve assembly disposed at each inlet port respectively, wherein the valve assembly is configured to operate within the T-shaped housing according to the fluid flow, wherein the valve assembly disposed at each inlet port, comprising:
a disc provided with a spring, a seat ring and a washer;
wherein the disc at the first inlet port is configured to move between an open position and a closed position, and
the seat ring disposed at the first inlet port and second inlet port for securely holding the disc via the first inlet port and the second inlet port.

8. The dual disk check valve of claim 7, wherein the first inlet port, second inlet port, and the outlet port are a combination of a shuttle valve and a non-return valve.

9. The dual disk check valve of claim 7, wherein the first inlet port is configured to automatically close when the fluid flows from the second inlet port.

10. The dual disk check valve of claim 7, is made of at least one of a material includes thermoset materials, thermoplastics materials, and metals.

* * * * *